(12) United States Patent
Yu

(10) Patent No.: US 9,188,800 B2
(45) Date of Patent: Nov. 17, 2015

(54) LIQUID CRYSTAL DISPLAY DEVICE

(71) Applicant: Shenzhen China Star Optoelectronics Technology Co., Ltd., Shenzhen, Guangdong (CN)

(72) Inventor: Gang Yu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 20 days.

(21) Appl. No.: 14/126,432

(22) PCT Filed: Nov. 13, 2013

(86) PCT No.: PCT/CN2013/087079
§ 371 (c)(1),
(2) Date: Dec. 15, 2013

(87) PCT Pub. No.: WO2015/066942
PCT Pub. Date: May 14, 2015

(65) Prior Publication Data
US 2015/0124191 A1    May 7, 2015

(30) Foreign Application Priority Data
Nov. 5, 2013  (CN) .......................... 2013 1 0542966

(51) Int. Cl.
*G02F 1/1333*  (2006.01)
*F21V 7/04*  (2006.01)

(52) U.S. Cl.
CPC .................. *G02F 1/133308* (2013.01); *G02F 2001/133314* (2013.01)

(58) Field of Classification Search
CPC .............. G02F 1/133308; G02F 2001/133317; G02F 2001/133322
USPC ...................... 349/58; 362/632, 634
See application file for complete search history.

(56) References Cited

U.S. PATENT DOCUMENTS

| | | | |
|---|---|---|---|
| 6,741,300 B2 | 5/2004 | Lee et al. | |
| 6,862,053 B2* | 3/2005 | Lee et al. | 349/58 |
| 7,118,267 B2 | 10/2006 | Li et al. | |
| 2011/0051033 A1* | 3/2011 | Shimizu | 349/58 |

FOREIGN PATENT DOCUMENTS

| | | |
|---|---|---|
| CN | 102121641 A | 7/2011 |
| CN | 202230269 U | 5/2012 |
| CN | 102508377 A | 6/2012 |

* cited by examiner

*Primary Examiner* — Nathanael R Briggs
(74) *Attorney, Agent, or Firm* — Andrew C. Cheng

(57) ABSTRACT

The present invention provides a frameless liquid crystal display device, which includes: a rear casing (2), a mold frame (4) fixedly mounted in the rear casing (2), a backlight module (6) fixedly mounted in the mold frame (4), and a liquid crystal display panel (8) mounted in the mold frame (4) and located above the backlight module (6). The mold frame (4) includes a bottom plate (42), two first side plates (44) perpendicularly connected to the bottom plate (42) to be opposite to each other, and second side plates (46) perpendicularly connected to the bottom plate (42) and each having two ends respectively connected to the two first side plates (44). The two first side plates (44) are each provided with a first receiving slot (442) and a second receiving slot (444). The backlight module (6) is fit into and retained in the first receiving slots (442). The liquid crystal display panel (8) is fit into and retained in the second receiving slots (444). The backlight module and the liquid crystal display panel are releasably mounted to the mold frame through fitting engagement. The structure is simple and mounting is easy.

14 Claims, 6 Drawing Sheets

LIQUID CRYSTAL DISPLAY DEVICE

BACKGROUND OF THE INVENTION

1. Field of the Invention

The present invention relates to a display device, and in particular to a frameless liquid crystal display device.

2. The Related Arts

Liquid crystal displays (LCDs) have a variety of advantages, such as thin device body, low power consumption, and being free of radiation, and are thus of wide applications. Most of the liquid crystal displays that are currently available in the market are backlighting liquid crystal displays, which comprise a liquid crystal display panel and a backlight module. The operation principle of the liquid crystal display panel is that, with liquid crystal molecules interposed between two parallel glass substrates, application of electricity is selectively carried out to control the liquid crystal molecules to change direction in order to refract out light emitting from the backlight module for generating images.

The liquid crystal display generally comprises a rear casing, a front bezel mating the rear casing, a backlight module arranged in the rear casing, a mold frame arranged on the backlight module, and a liquid crystal display panel arranged on the mold frame, wherein the mold frame functions to support the liquid crystal display panel thereon and the front bezel fixes the liquid crystal display panel.

The liquid crystal display panel comprises a color filter (CF) substrate, a thin-film transistor (TFT) substrate, liquid crystal (LC) ad sealant interposed between the CF substrate and the TFT substrate. A step is formed between edges of the CF substrate and the TFT substrate for electrical connection with an external device in order to drive the liquid crystal display panel.

With continuous development of the manufacturing techniques of the liquid crystal display, the liquid crystal display is in a trend toward frame slimming and is further toward being frameless. However, fixing of a liquid crystal display panel and a backlight module of a frameless liquid crystal display is still a challenge to overcome today.

Referring to FIG. 1, a schematic view is given to show the structure of a conventional frameless liquid crystal display, which comprises: a rear casing 100, a mold frame 200 arranged in the rear casing 100, a backlight module 300 arranged in the mold frame 200, and a liquid crystal display panel 400 arranged in the mold frame 200 and located above the backlight module 300. The liquid crystal display panel 400 is bonded to the mold frame 200 through a bonding means (such as glue, instantaneous adhesive, heat-curable adhesive, and photo-curable adhesive) 500 and the backlight module 300 is also fixed to the mold frame 200 through bonding so as to achieve fixing of the liquid crystal display panel 400 and the backlight module 200 of the frameless liquid crystal display. Further, a circuit accommodation section 600 is formed between one side of the mold frame 200 and one sidewall of sidewalls 120 of the rear casing 100 that is parallel to the side of the mold frame 200 for receiving therein a plurality of circuit films 700 and a PCB (Printed Circuit Board) 800 that are in electrical connection with the liquid crystal display panel 400 and decorative cover 900 is provided to cover the circuit accommodation section 600 so as to achieve fixing of the PCB 800 of the liquid crystal display panel. Such a known device does not include a front bezel that is commonly used in liquid crystal displays so that the thickness can be minimized with improved aesthetics by means of such a structure. Further, the PCB 800 that was previously arranged under the backlight module 300 is set at one side of the liquid crystal display panel 400 so as to further reduce the thickness of the liquid crystal display.

However, such a structure of liquid crystal display requires the liquid crystal display panel 400 and the backlight module 300 both be fixed by the bonding means 500. To securely fix the liquid crystal display panel 400 and the backlight module 300 to the mold frame 200, the bonding means 500 must have sufficiently strong adhesion. This makes removal of the bonding means 500 difficult in detaching the liquid crystal display panel 400 and the backlight module 300 and the liquid crystal display panel 400 and the backlight module 300 may thus get damaged, leading to a significant loss and being adverse to disassembling operations performed in after services and increasing the maintenance cost.

SUMMARY OF THE INVENTION

An object of the present invention is to provide a frameless liquid crystal display, which has a simple structure, is easy to assemble, and can effectively lower down maintenance costs.

To achieve the above object, the present invention provides a frameless liquid crystal display device, which comprises: a rear casing, a mold frame fixedly mounted in the rear casing, a backlight module fixedly mounted in the mold frame, and a liquid crystal display panel mounted in the mold frame and located above the backlight module. The mold frame comprises a bottom plate, two first side plates perpendicularly connected to the bottom plate to be opposite to each other, and second side plates perpendicularly connected to the bottom plate and each having two ends respectively connected to the two first side plates. The two first side plates are each provided with a first receiving slot and a second receiving slot. The backlight module is fit into and retained in the first receiving slots. The liquid crystal display panel is fit into and retained in the second receiving slots.

The mold frame is fixed in the rear casing by screws.

The backlight module comprises: a light guide plate, a backlight source arranged at one side of the light guide plate, an optic film assembly arranged on the light guide plate, and a reflector plate arranged under the light guide plate.

The light guide plate has opposite ends that are respectively provided with first engaging sections corresponding to the two first receiving slots. The first engaging sections are respectively fit into and retained in the first receiving slots so as to mount the light guide plate in the mold frame through fitting engagement. The backlight source is mounted to the second side plates to correspond to the light guide plate.

The backlight module comprises: a diffusion plate, a backlight source arranged under the diffusion plate, an optic film assembly arranged on the diffusion plate, and a reflector plate arranged under the diffusion plate. The diffusion plate is fit into and retained by the first receiving slots. The backlight source is mounted to the bottom plate to correspond to the diffusion plate.

The liquid crystal display panel comprises: a CF (Color Filter) substrate, a TFT (Thin-Film Transistor) substrate opposite to and laminated on the CF substrate, and a liquid crystal layer arranged between the CF substrate and the TFT substrate. The CF substrate has a size smaller than a size of the TFT substrate so that after lamination, two opposite ends of the TFT substrate form stepped portions corresponding to the second receiving slots. The stepped portions are respectively fit into and retained in the second receiving slots so as to mount the liquid crystal display panel in the mold frame through fitting engagement.

The rear casing comprises a first accommodation section and a second accommodation section. The mold frame, the backlight module, and the liquid crystal display panel are received in the first accommodation section.

The frameless liquid crystal display device further comprises: a PCB (Printed Circuit Board) in electrical connection with the liquid crystal display panel, a supporting frame supporting the PCB, and a decorative cover covering the second accommodation section of the rear casing. The supporting frame is mounted in the second accommodation section. The PCB is mounted on the supporting frame.

The PCB comprises: a first board section, a second board section, and a third board section. Sizes of the first board section, the second board section, and the third board section re sequentially increased. The supporting frame comprises a first support section, a second support section, and a third support section formed thereon in a step-like configuration and respectively corresponding to the first board section, the second board section, and the third board section. The first board section, the second board section, and the third board section are respectively mounted to the first support section, the second support section, and the third support section.

The supporting frame is fixed in the second accommodation section by screws and the decorative cover is mounted to the second accommodation section through snap fitting.

The present invention also provides a frameless liquid crystal display device, which comprises: a rear casing, a mold frame fixedly mounted in the rear casing, a backlight module fixedly mounted in the mold frame, and a liquid crystal display panel mounted in the mold frame and located above the backlight module, the mold frame comprising a bottom plate, two first side plates perpendicularly connected to the bottom plate to be opposite to each other, and second side plates perpendicularly connected to the bottom plate and each having two ends respectively connected to the two first side plates, the two first side plates each provided with a first receiving slot and a second receiving slot, the backlight module being fit into and retained in the first receiving slots, the liquid crystal display panel being fit into and retained in the second receiving slots;

wherein the mold frame is fixed in the rear casing by screws;

wherein the backlight module comprises: a light guide plate, a backlight source arranged at one side of the light guide plate, an optic film assembly arranged on the light guide plate, and a reflector plate arranged under the light guide plate;

wherein the light guide plate has opposite ends that are respectively provided with first engaging sections corresponding to the two first receiving slots, the first engaging sections being respectively fit into and retained in the first receiving slots so as to mount the light guide plate in the mold frame 4 through fitting engagement, the backlight source being mounted to the second side plates to correspond to the light guide plate; and wherein the liquid crystal display panel comprises: a CF (Color Filter) substrate, a TFT (Thin-Film Transistor) substrate opposite to and laminated on the CF substrate, and a liquid crystal layer arranged between the CF substrate and the TFT substrate, the CF substrate having a size smaller than a size of the TFT substrate so that after lamination, two opposite ends of the TFT substrate form stepped portions corresponding to the second receiving slots, the stepped portions being respectively fit into and retained in the second receiving slots so as to mount the liquid crystal display panel in the mold frame through fitting engagement.

The rear casing comprises a first accommodation section and a second accommodation section. The mold frame, the backlight module, and the liquid crystal display panel are received in the first accommodation section.

The frameless liquid crystal display device further comprises: a PCB (Printed Circuit Board) in electrical connection with the liquid crystal display panel, a supporting frame supporting the PCB, and a decorative cover covering the second accommodation section of the rear casing. The supporting frame is mounted in the second accommodation section. The PCB is mounted on the supporting frame.

The PCB comprises: a first board section, a second board section, and a third board section. Sizes of the first board section, the second board section, and the third board section are sequentially increased. The supporting frame comprises a first support section, a second support section, and a third support section formed thereon in a step-like configuration and respectively corresponding to the first board section, the second board section, and the third board section. The first board section, the second board section, and the third board section are respectively mounted to the first support section, the second support section, and the third support section.

The supporting frame is fixed in the second accommodation section by screws and the decorative cover is mounted to the second accommodation section through snap fitting.

The efficacy of the present invention is that the present invention provides a frameless liquid crystal display device, which comprises two receiving slots formed in a mold frame and an engaging section and a stepped portion respectively formed on a backlight module and a liquid crystal display panel to mate the two receiving slots so as to allow the backlight module and the liquid crystal display panel to be releasably mounted to the mold frame through fitting engagement, thereby achieving fixing of the backlight module and the liquid crystal display panel of the frameless liquid crystal display device, which has a simple structure, is easy to mount, allows for easy detaching when maintenance or replacement of the backlight module or the liquid crystal display panel is necessary so as to effectively reduce the cost of maintenance.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
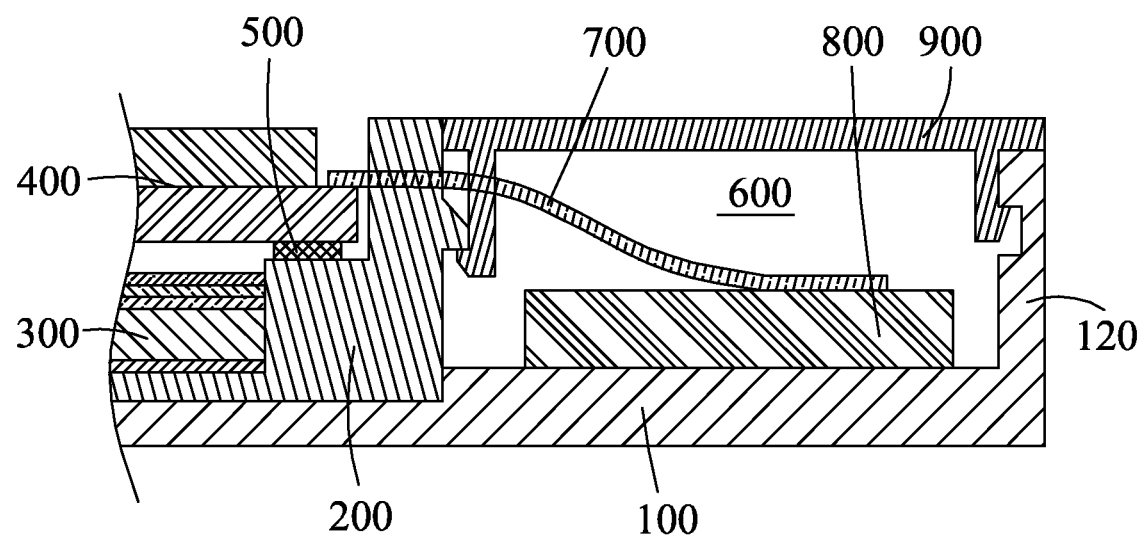
FIG. 1 is a schematic view showing the structure of a conventional frameless liquid crystal display.
Figure 2:
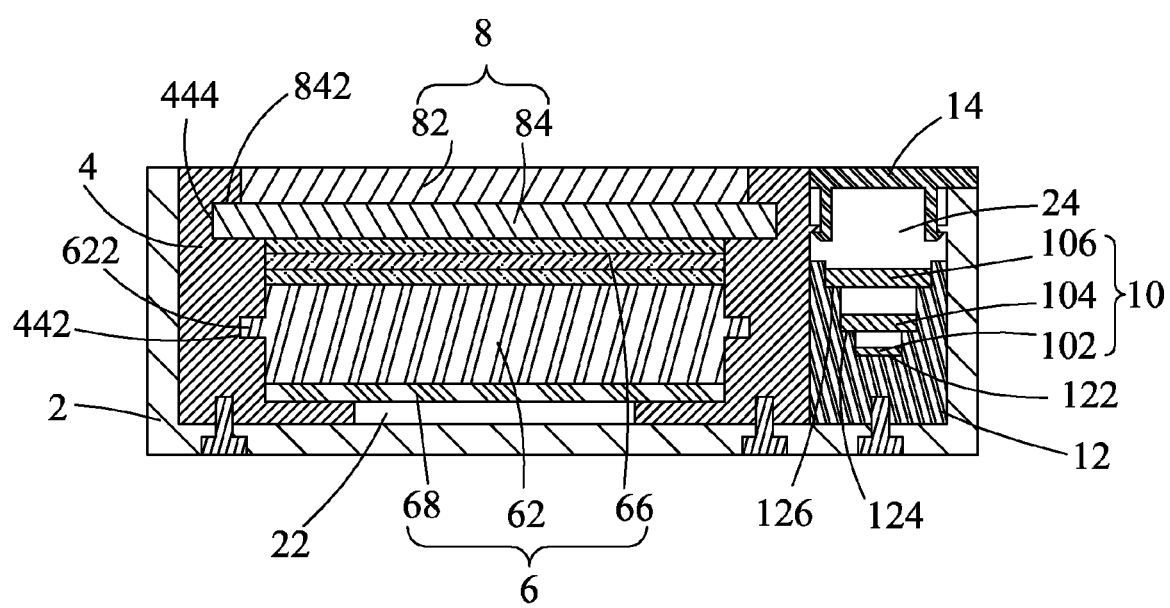
FIG. 2 is a schematic view showing the structure of a frameless liquid crystal display according to a preferred embodiment of the present invention.
Figure 3:
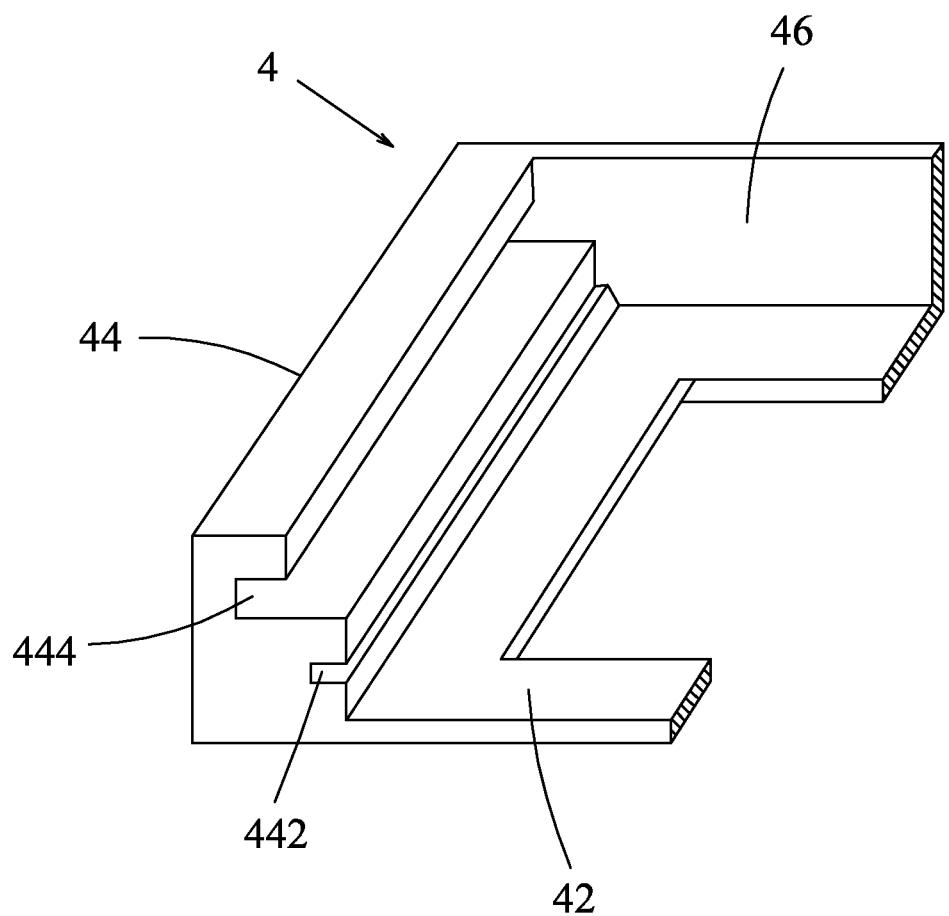
FIG. 3 is a perspective view of a mold frame of FIG. 2.
Figure 4:
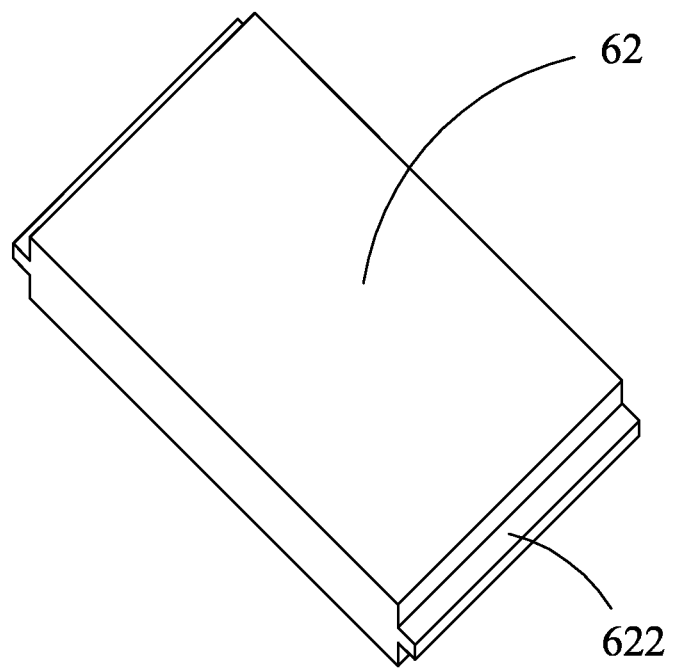
FIG. 4 is a perspective view of a light guide plate of FIG. 2.
Figure 5:
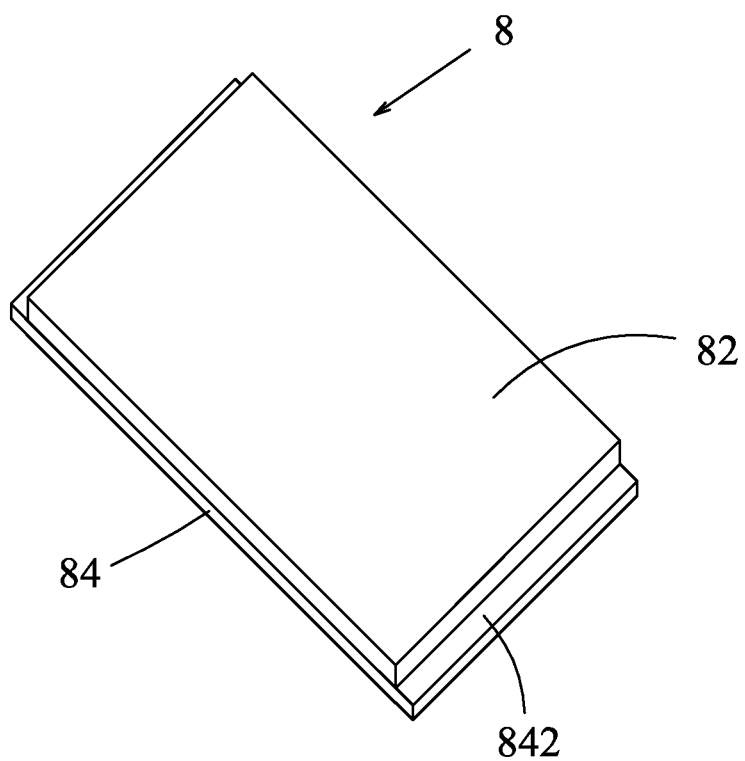
FIG. 5 is a perspective view of a liquid crystal display panel of FIG. 2.

Referring to FIG. 2, which is a schematic view showing the structure of a frameless liquid crystal display device according to a preferred embodiment of the present invention, reference being also had to FIGS. 3-5, the present invention provides a frameless liquid crystal display device, which comprises: e rear casing 2, a mold frame 4 fixedly mounted in the rear casing 2, a backlight module 6 fixedly mounted in the mold frame 4, and a liquid crystal display panel 8 mounted in the mold frame 4 and located above the backlight module 6. The mold frame 4 comprises a bottom plate 42, two first side plates 44 perpendicularly connected to the bottom plate 42 to be opposite to each other, and second side plates 46 perpendicularly connected to the bottom plate 42 and each having two ends respectively connected to the two first side plates 44. The two first side plates 44 and the second side plates 46 collectively and circumferentially delimit a receiving space having an open end. The two first side plates 44 are each provided with a first receiving slot 442 and a second receiving slot 444. The backlight module 6 is inserted through an open end into the first receiving slot 442 to engage and be retained in the first receiving slot 442. The liquid crystal display panel 8 is inserted through an open end into the second receiving slot 444 to engage and be retained in the second receiving slot 444. With the arrangement of two receiving slots in the mold frame and formation of an engaging section and a stepped portion respectively on the backlight module and the liquid crystal display panel to mate the two receiving slots, the backlight module and the liquid crystal display panel are releasably mounted to the mold frame through fitting engagement so as to achieve fixing of the backlight module and the liquid crystal display panel of the frameless liquid crystal display device, which has a simple structure, is easy to mount, allows for easy detaching when maintenance or replacement of the backlight module or the liquid crystal display panel is necessary so as to effectively reduce the cost of maintenance.

Specifically, in the instant embodiment, the backlight module 6 is a side-edge backlight module, which comprises: a light guide plate 62, a backlight source (not shown) arranged at one side of the light guide plate 62, an optic film assembly 66 arranged on the light guide plate 62, and a reflector plate 68 arranged under the light guide plate 62. The light guide plate 62 has opposite ends that are respectively provided with first engaging sections 622 corresponding to the two first receiving slot 442. The first engaging sections 622 are respectively fit into and retained in the first receiving slots 442 so as to mount the light guide plate 62 in the mold frame 4 through fitting engagement and the backlight source is mounted to the second side plates 46 to correspond to the light guide plate 62, thereby achieving fixing of the backlight module 6 in the mold frame 4.

Further, the liquid crystal display panel 8 comprises: a CF (Color Filter) substrate 82, a TFT (Thin-Film Transistor) substrate 84 opposite to and laminated on the CF substrate 82, and a liquid crystal layer (not shown) arranged between the CF substrate 82 and the TFT substrate 84. The CF substrate 82 has a size smaller than size of the TFT substrate 84 so that after lamination, two opposite ends of the TFT substrate 84 form stepped portions 842 corresponding to the second receiving slots 444. The stepped portions 842 are respectively fit into and retained in the second receiving slots 444 so as to mount the liquid crystal display panel 8 in the mold frame 4 through fitting engagement.

To assemble, the backlight source is first mounted to the second side plates 46 of the mold frame 4. The light guide plate 62 that comprises the optic film assembly 66 is then inserted through the open end into each of the first receiving slot 442. Afterwards, the liquid crystal display panel 8 is inserted into the second receiving slots 444. Finally, the mold frame 4 are fixed in the rear casing 2 by screws so as to complete the assembly of the liquid crystal display according to the present invention.

It is noted that the frameless liquid crystal display device according to the present invention may further comprise: a PCB (Printed Circuit Board) 10 in electrical connection with the liquid crystal display panel 8, a supporting frame 12 supporting the PCB 10, and a decorative cover 14.

Further, the rear casing 2 comprises a first accommodation section 22 and a second accommodation section 24. The mold frame 4, the backlight module 6, and the liquid crystal display panel 8 are received in the first accommodation section 22. The supporting frame 12 is fixedly mounted in the second accommodation section 24 by means of screws. The PCB 10 is mounted on the supporting frame 12. The decorative cover 14 is mounted on the second accommodation section 24 through snap fitting so as to completely cover the PCB 10 to prevent dusts from falling onto the PCB 10.

Specifically, in the instant embodiment, the PCB 10 comprises: a first board section 102, a second board section 104, and a third board section 106. Sizes of the first board section 102, the second board section 104, and the third board section 106 are sequentially increased. The supporting frame 12 comprises a first support section 122, a second support section 124, and a third support section 126 formed thereon in a step-like configuration and respectively corresponding to the first board section 102, the second board section 104, and the third board section 106. The first board section 102, the second board section 104, and the third board section 106 are respectively mounted to the first support section 122, the second support section 124, and the third support section 126. The first board section 102, the second board section 104, and the third board section 106 may be provided with different drive circuits for driving the liquid crystal display for displaying. When the PCB 10 gets malfunctioning and requires maintenance, it only needs to open the decorative cover 14 for removal of the PCB 10, so that the operation is easy and the maintenance cost can be effectively reduced.

Figure 6:
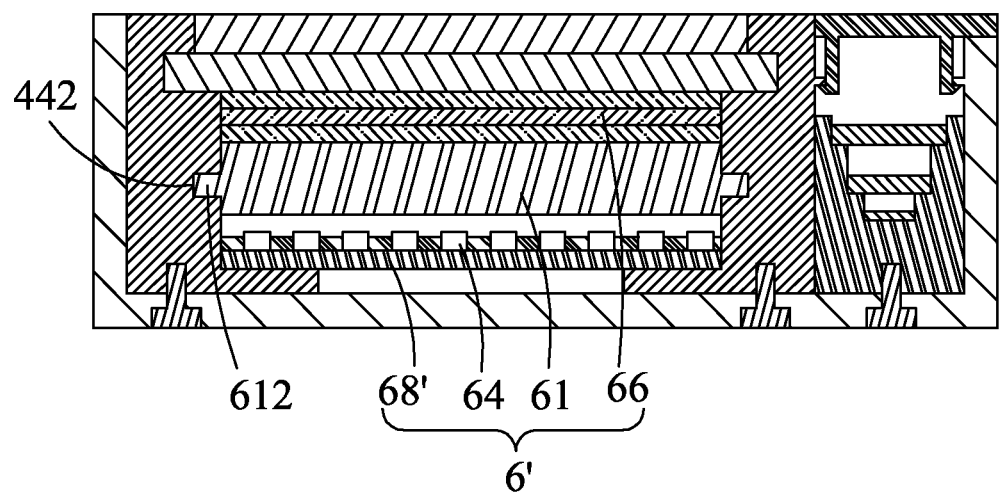
FIG. 6 is a schematic view showing the structure of a frameless liquid crystal display according to another preferred embodiment of the present invention.

Referring to FIG. 6, together with FIGS. 3 and 5, in the instant embodiment, the backlight module 6' is a direct type backlight module, which comprises: a diffusion plate 61, a backlight source 64 arranged under the diffusion plate 61, an optic film assembly 66 arranged on the diffusion plate 61, and a reflector plate 68' arranged under the diffusion plate 61. The diffusion plate 61 has two ends that form second engaging sections 612 to respectively correspond to the two first receiving slots 442. The second engaging sections 612 are fit into and retained in the first receiving slots 442. The backlight source 64 is mounted on the bottom plate 42 to correspond to the diffusion plate 61. This arrangement is equally applicable to the frameless liquid crystal display device of the present invention to achieve the same technical effectiveness.

In summary, the present invention provides a frameless liquid crystal display device, which comprises two receiving slots formed in a mold frame and an engaging section and a stepped portion respectively formed on a backlight module and a liquid crystal display panel to mate the two receiving slots so as to allow the backlight module and the liquid crystal display panel to be releasably mounted to the mold frame through fitting engagement, thereby achieving fixing of the backlight module and the liquid crystal display panel of the frameless liquid crystal display device, which has a simple structure, is easy to mount, allows for easy detaching when maintenance or replacement of the backlight module or the liquid crystal display panel is necessary so as to effectively reduce the cost of maintenance.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising: a rear casing, a mold frame fixedly mounted in the rear casing, a backlight module fixedly mounted in the mold frame, and a liquid crystal display panel mounted in the mold frame and located above the backlight module, the liquid crystal display panel comprising a CF (Color Filter) substrate and a TFT (Thin-Film Transistor) substrate laminated on each other, the TFT substrate having two opposite edge portions exceeding opposite edges of the CF substrate, the mold frame comprising a bottom plate, two first side plates perpendicularly connected to the bottom plate to be opposite to each other, and a second side plate perpendicularly connected to the bottom plate and having two ends respectively connected to the two first side plates, the two first side plates each provided with a first receiving slot and a second receiving slot, each of which has an end opening distant from the second side plate, the backlight module having two opposite edge portions that are respectively received through the end openings of the first receiving slots of the first side plates to be fit into and retained in the first receiving slots, the liquid crystal display panel being arranged to have the two opposite edge portions of the TFT substrate respectively received through the end openings of the second receiving slots of the first side plates to be fit into and retained in the second receiving slots, wherein the first receiving slot of each of the first side plates is delimited between two spaced and opposing walls that respectively engage opposite surfaces of the edge portion of the backlight module and wherein the second receiving slot of each of the first side plate is delimited between upper and lower walls that are spaced and opposing each other and respectively engage opposite surfaces of the edge portion of the TFT substrate, the upper walls being sized to accommodate and hold the CF substrate therebetween so as to have the CF substrate exposed.

2. The liquid crystal display device as claimed in claim 1, wherein the mold frame is fixed in the rear casing by screws.

3. The liquid crystal display device as claimed in claim 1, wherein the backlight module comprises: a light guide plate, a backlight source arranged at one side of the light guide plate, an optic film assembly arranged on the light guide plate, and a reflector plate arranged under the light guide plate.

4. The liquid crystal display device as claimed in claim 3, wherein the light guide plate has opposite ends that are respectively provided with first engaging sections corresponding to the two first receiving slots to serve as the edge portions of the backlight module that are respectively fit into and retained in the first receiving slots so as to mount the light guide plate in the mold frame through fitting engagement, the backlight source being mounted to the second side plate to correspond to the light guide plate.

5. The liquid crystal display device as claimed in claim 1, wherein the backlight module comprises: a diffusion plate, a backlight source arranged under the diffusion plate, an optic film assembly arranged on the diffusion plate, and a reflector plate arranged under the diffusion plate, the diffusion plate comprising the edge portions that are fit into and retained by the first receiving slots, the backlight source being mounted to the bottom plate to correspond to the diffusion plate.

6. The liquid crystal display device as claimed in claim 1, wherein the rear casing comprises a first accommodation section and a second accommodation section, the mold frame, the backlight module, and the liquid crystal display panel being received in the first accommodation section.

7. The liquid crystal display device as claimed in claim 6 further comprising: a PCB (Printed Circuit Board) in electrical connection with the liquid crystal display panel, a supporting frame supporting the PCB, and a decorative cover covering the second accommodation section of the rear casing, the supporting frame being mounted in the second accommodation section, the PCB being mounted on the supporting frame.

8. The liquid crystal display device as claimed in claim 7, wherein the PCB comprises: a first board section, a second board section, and a third board section, sizes of the first board section, the second board section, and the third board section being sequentially increased, the supporting frame comprising a first support section, a second support section, and a third support section formed thereon in a step-like configuration and respectively corresponding to the first board section, the second board section, and the third board section, the first board section, the second board section, and the third board section being respectively mounted to the first support section, the second support section, and the third support section.

9. The liquid crystal display device as claimed in claim 7, wherein the supporting frame is fixed in the second accommodation section by screws and the decorative cover is mounted to the second accommodation section through snap fitting.

10. A liquid crystal display device, comprising: a rear casing, a mold frame fixedly mounted in the rear casing, a backlight module fixedly mounted in the mold frame, and a liquid crystal display panel mounted in the mold frame and located above the backlight module, the liquid crystal display panel comprising a CF (Color Filter) substrate and a TFT (Thin-Film Transistor) substrate laminated on each other, the TFT substrate having two opposite edge portions exceeding opposite edges of the CF substrate, the mold frame comprising a bottom plate, two first side plates perpendicularly connected to the bottom plate to be opposite to each other, and a second side plate perpendicularly connected to the bottom plate and having two ends respectively connected to the two first side plates, the two first side plates each provided with a first receiving slot and a second receiving slot, each of which has an end opening distant from the second side plate, the backlight module having two opposite edge portions that are respectively received through the end openings of the first receiving slots of the first side plates to be fit into and retained in the first receiving slots, the liquid crystal display panel being arranged to have the two opposite edge portions of the TFT substrate respectively received through the end openings of the second receiving slots of the first side plates to be fit into and retained in the second receiving slots, wherein the first receiving slot of each of the first side plates is delimited between two spaced and opposing walls that respectively engage opposite surfaces of the edge portion of the backlight module and wherein the second receiving slot of each of the first side plate is delimited between upper and lower walls that are spaced and opposing each other and respectively engage opposite surfaces of the edge portion of the TFT substrate, the upper walls being sized to accommodate and hold the CF substrate therebetween so as to have the CF substrate exposed;

wherein the mold frame is fixed in the rear casing by screws;

wherein the backlight module comprises: a light guide plate, a backlight source arranged at one side of the light guide plate, an optic film assembly arranged on the light guide plate, and a reflector plate arranged under the light guide plate; and wherein the light guide plate has opposite ends that are respectively provided with first engaging sections corresponding to the two first receiving slots to serve as the edge portions of the backlight module that are respectively fit into and retained in the first receiving slots so as to mount the light guide plate in the mold frame through fitting engagement, the backlight source being mounted to the second side plate to correspond to the light guide plate.

11. The liquid crystal display device as claimed in claim 10, wherein the rear casing comprises a first accommodation section and a second accommodation section, the mold frame, the backlight module, and the liquid crystal display panel being received in the first accommodation section.

12. The liquid crystal display device as claimed in claim 11 further comprising: a PCB (Printed Circuit Board) in electrical connection with the liquid crystal display panel, a supporting frame supporting the PCB, and a decorative cover covering the second accommodation section of the rear casing, the supporting frame being mounted in the second accommodation section, the PCB being mounted on the supporting frame.

13. The liquid crystal display device as claimed in claim 12, wherein the PCB comprises: a first board section, a second board section, and a third board section, sizes of the first board section, the second board section, and the third board section being sequentially increased, the supporting frame comprising a first support section, a second support section, and a third support section formed thereon in a step-like configuration and respectively corresponding to the first board section, the second board section, and the third board section, the first board section, the second board section, and the third board section being respectively mounted to the first support section, the second support section, and the third support section.

14. The liquid crystal display device as claimed in claim 12, wherein the supporting frame is fixed in the second accommodation section by screws and the decorative cover is mounted to the second accommodation section through snap fitting.

* * * * *